(12) United States Patent
Rehfeld et al.

(10) Patent No.: US 7,882,082 B2
(45) Date of Patent: *Feb. 1, 2011

(54) REPAIRING LINKS IN LOCKED FILES

(75) Inventors: Martin Rehfeld, Hamburg (DE); Lance Lewis, San Ramon, CA (US); Michele K. Tomac, Morgan Hill, CA (US); Kevin A. Hogan, Morgan Hill, CA (US)

(73) Assignee: Adobe Systems Incorporated, San Jose, CA (US)

( * ) Notice: Subject to any disclaimer, the term of this patent is extended or adjusted under 35 U.S.C. 154(b) by 768 days.

This patent is subject to a terminal disclaimer.

(21) Appl. No.: 11/448,958

(22) Filed: Jun. 6, 2006

(65) Prior Publication Data

US 2006/0230050 A1 Oct. 12, 2006

Related U.S. Application Data

(63) Continuation of application No. 10/306,619, filed on Nov. 27, 2002, now Pat. No. 7,072,893.

(51) Int. Cl.
*G06F 7/00* (2006.01)
*G06F 17/30* (2006.01)

(52) U.S. Cl. .................. 707/691; 707/704; 707/689; 709/219; 709/203

(58) Field of Classification Search .............. 707/8, 707/100, 102; 709/219, 203
See application file for complete search history.

(56) References Cited

U.S. PATENT DOCUMENTS

| | | | |
|---|---|---|---|
| 5,574,898 A * | 11/1996 | Leblang et al. ............ 707/1 |
| 5,764,906 A | 6/1998 | Edelstein et al. | |
| 5,884,309 A | 3/1999 | Vanechanos, Jr. | |
| 5,995,099 A | 11/1999 | Horstmann | |
| 6,134,552 A | 10/2000 | Fritz et al. | |
| 6,219,676 B1 | 4/2001 | Reiner | |
| 6,772,139 B1 * | 8/2004 | Smith, III ............... 707/3 |
| 6,823,379 B1 | 11/2004 | Heckel et al. | |
| 6,973,656 B1 * | 12/2005 | Huynh et al. .............. 719/315 |
| 7,028,031 B1 | 4/2006 | Rehfeld | |

(Continued)

OTHER PUBLICATIONS

"Software QA/Test Resource Center" [online]. © 1996-2002 by Rick Hower. <http://www.softwareqatest.com/qatweb1.html>.

(Continued)

*Primary Examiner*—Apu M Mofiz
*Assistant Examiner*—Cindy Nguyen
(74) *Attorney, Agent, or Firm*—Fish & Richardson P.C.

(57) ABSTRACT

Methods and apparatus, including computer program products, implementing a technique for repairing links in a file. The file can contain one or more links, each link referring to a target file. For one or more of the links, a file identifier such as a file name, file number, or file address is stored. Alternatively, for one or more of the links, target information is stored that identifies an old target and a new target for the link. The links can be repaired based on the stored information. The stored information can be used to identify changes to the links that occurred while the file containing the link was inaccessible to the system, for example, due to the file being locked by a user.

10 Claims, 3 Drawing Sheets

U.S. PATENT DOCUMENTS

| | | |
|---|---|---|
| 7,072,893 B1 | 7/2006 | Rehfeld et al. |
| 7,249,314 B2 | 7/2007 | Walker et al. |
| 7,529,778 B1 | 5/2009 | Dewey et al. |
| 2001/0044825 A1 | 11/2001 | Barritz |
| 2002/0120648 A1* | 8/2002 | Ball et al. .................... 707/511 |
| 2002/0147805 A1* | 10/2002 | Leshem et al. .............. 709/223 |
| 2003/0158871 A1 | 8/2003 | Fomenko |
| 2003/0158953 A1* | 8/2003 | Lal ............................ 709/230 |
| 2003/0208472 A1 | 11/2003 | Pham |
| 2004/0024848 A1 | 2/2004 | Smith et al. |

OTHER PUBLICATIONS

Microsoft® FrontPage® "Effective Site Management with Microsoft FrontPage 2002" White Paper, published May 2001, 15 pages.

\* cited by examiner

| Old Target Address | New Target Address |
|---|---|
| www.home.news.html | www.archive.news.html |
| ... | |

*FIG. 4*

| Old Target ID | New Target ID |
|---|---|
| File 001 | File 002 |
| ... | |

*FIG. 5*

| Commands |
|---|
| File.move(new location) |
| ... |

*FIG. 6*

REPAIRING LINKS IN LOCKED FILES

CROSS-REFERENCE TO RELATED APPLICATION

This application is a continuation of, and claims priority to, U.S. patent application Ser. No. 10/306,619, entitled REPAIRING LINKS IN LOCKED FILES, filed Nov. 27, 2002, now U.S. Pat. No. 7,072,893, to inventors Martin Rehfeld, Lance Lewis, Michele K. Tomac, and Kevin A. Hogan. The entire disclosure of the foregoing application is incorporated here by reference.

BACKGROUND

The present invention relates to repairing links in locked files.

A link is a pointer that refers to a target. In a file, a link can be represented as a uniform resource locator (URL) that specifies the address of the target. The target can be located in the same file as the file containing the link or in a different location, such as in another file. When the target of a link moves, the link can break or become ambiguous. A broken link is a link that points to a location that is empty because the target file that occupied the location has moved. An ambiguous link is a link that points to a location that is not empty, but contains a different target file.

Link management systems generally have tools that repair broken or ambiguous links. However, such tools do not work in all situations. For example, the tools cannot repair links in files that are locked by a user. While a file is locked, the file is inaccessible to the system. Thus, the system cannot modify the links in the file.

SUMMARY OF THE INVENTION

The invention provides methods and apparatus, including computer program products, for repairing links in a file. The techniques include locking a first file, the first file containing one or more links, each link specifying an address of a target file; for one or more of the links in the first file, storing a file identifier that identifies the target file of the link; unlocking the first file; and repairing one or more of the links in the first file based on the stored file identifiers.

Particular implementations can include one or more of the following features. The stored file identifier can include a file name, file number, or file address of the target file. The link repair can include identifying broken or ambiguous links in the first file. The broken or ambiguous links can be repaired based on a pre-determined policy. A broken link can be repaired by using the stored file identifier for the link to locate a new address of the target file and modifying the link to refer to the new address. An ambiguous link can be repaired by selecting a target based on the pre-determined policy or based on user input.

The invention can be implemented to realize one or more of the following advantages. While a file is locked by a user, the links in the file can be tracked to detect links that break or become ambiguous. The user can be notified about the broken or ambiguous links and can be provided with proposed repairs to the links. Alternatively, the repairs can be performed automatically without user input.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 4 illustrates one example of a data structure for tracking changes.

FIG. 5 illustrates another example of a data structure for tracking changes.

FIG. 6 illustrates another example of a data structure for tracking changes.

Like reference symbols in the various drawings indicate like elements.

DETAILED DESCRIPTION

Figure 1:
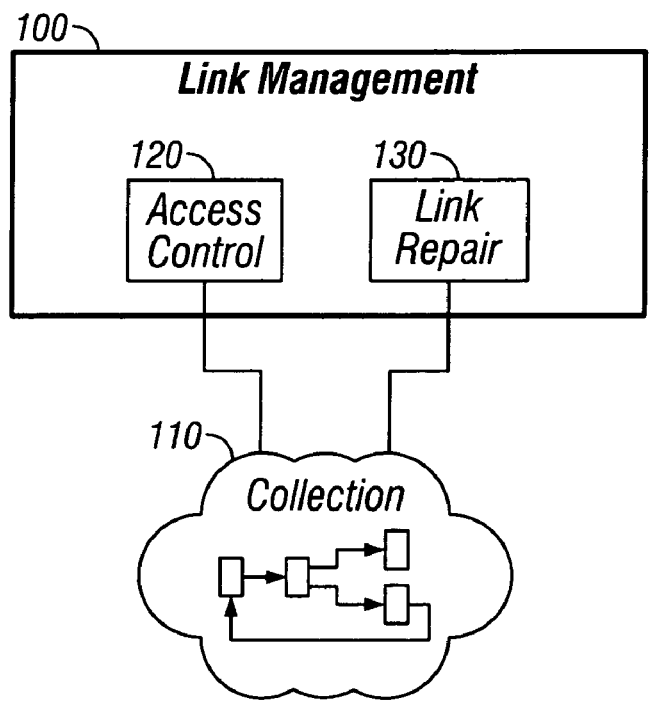
FIG. 1 is a block diagram illustrating a link management system.

FIG. 1 shows a link management system 100 which can implemented as a stand-alone system or as a component of another system such as a web site or document management system. Examples of such other systems include the GoLive® web site management system available from Adobe Systems Incorporated of San Jose, Calif. and the Acrobat® document management system also available from Adobe Systems Incorporated.

The link management system 100 manages a collection 110 of linked files. The collection 110 can be stored locally or at a remote location that is accessible over a network such as a local area network or the Internet. The files within the collection 110 can be linked together in various arrangements (e.g., hierarchical, sequential, or circular) and can represent different types of content (e.g., web pages in a web site or pages of an e-book). An e-book (electronic book) is a set of electronic files that display human-readable content as ordered pages, thereby giving the appearance of a book. A web site is a collection of files that are accessible over the World Wide Web (web) and are owned and managed by a single entity.

The link management system 100 can include an access control component 120. The access control component 120 enables a user to check out a file, for example, to perform editing operations on the file's content. While a file is checked out by a user, the access control component 120 places a write lock on the file to prevent the file from being modified by another entity (e.g., the system or another user).

The link management system 100 can include a link repair component 130. The link repair component 130 repairs broken or ambiguous links in a file. The link repair component 130 can also recalculate links in a file when the file is moved. The link repair component 130 can repair links in a file that is either locked or unlocked.

Figure 2:
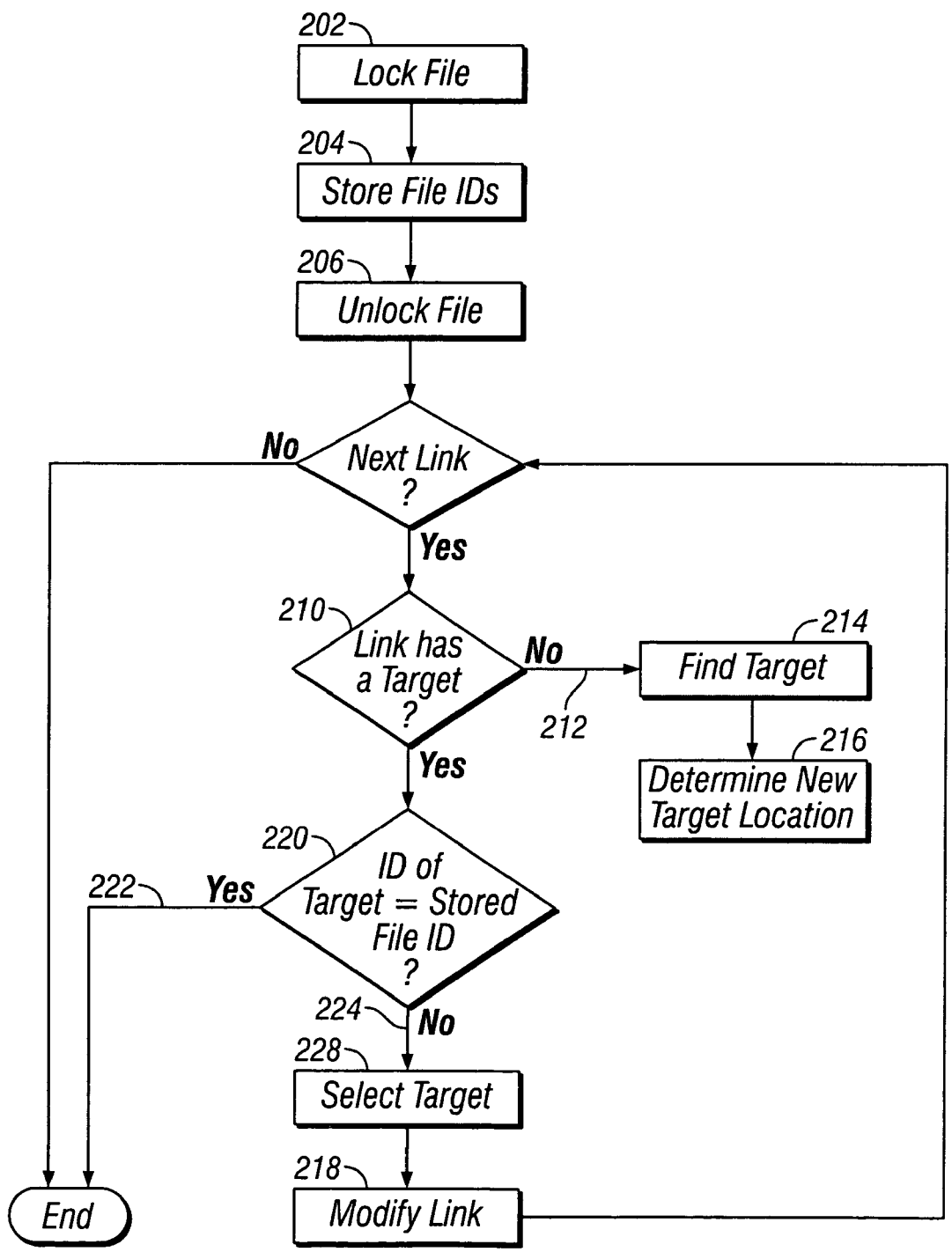
FIG. 2 is a flow diagram illustrating a method for repairing links in a locked file.

FIG. 2 shows a method 200 for repairing links in a file. The method begins when the access control component 120 locks a file in the collection 110 (202). The file contains one or more links, each link specifying an address of a target file. The locking of the file can occur in response to the file being checked out by a user.

Before the file is locked, the link repair component 130 stores a file identifier (file ID) for each link in the file and also the address of the locked file (204). The information can be stored as part of the locked file or in a separate data structure.

The file ID corresponds to the target file of the link and uniquely identifies the target file within the collection 110. The file ID does not change even if the file is moved. The file ID can include metadata relating to the file and/or its contents.

Metadata can include identifying information, such as a unique file identification number. In a system that uses a database to manage the files, the file ID can be a unique key (e.g., a primary key) of the database record corresponding to the file. Alternatively, metadata can more broadly refer to any data about the file or its contents. For example, the metadata can include a descriptive name or caption for the file.

Later, the access control component 120 unlocks the file (206). The unlocking can occur in response to a user checking the file back into the access control system 120.

Once the file is unlocked, the link repair component 130 examines the links in the file to determine whether the links are broken or ambiguous (208). For each link in the file, the link repair component 130 examines the location specified by the link to identify the current target (if any) of the link (210).

If no current target exists at the specified location, then the link is broken (212). To repair the broken link, the link repair component 130 uses the stored file ID for the link to locate the target (214). Upon locating the target, the link repair component 130 determines the new location of the target (216) and modifies the link to point to the new location (218). The modification can occur automatically without user intervention. Alternatively, the link repair component 130 can notify a user about the new location and receive user input confirming the new location.

If a current target exists at the specified location, then the link repair component 130 compares the file ID of the current target (current ID) with the stored file ID for the link (220). If the current ID is the same as the stored file ID, then the link is still intact (222) and does not need to be repaired.

If the current ID is different from the stored file ID, then the link is ambiguous (224). To repair the ambiguous link, the link repair component 130 can select a target (228), for example, by prompting the user to select between the current target and the stored target. If the current target is selected, the link does not need to be repaired because it already points to the current target. If the stored target is selected, then the link can be modified to point to the location of the stored target (218). Alternatively, instead of modifying the link, the link repair component 130 can move the stored target to the address specified by the link.

In one implementation, the repair of broken or ambiguous links can be performed automatically by the link repair component 130 without user intervention. The link repair component 130 can select a target for the broken or ambiguous link based on a pre-determined policy that specifies rules or criteria for selecting the target. For example, according to one policy, the link repair component 130 selects the target that is specified by the stored file ID; if that target cannot be located, then the link repair component 130 selects a substitute target that has a similar file name or address. If a substitute target cannot be selected, then the link repair component 130 prompts the user to select a target.

In addition to identifying broken or ambiguous links, the link repair component 130 can also use the stored address for the locked file to determine whether the file has moved (not shown). If the file has moved since the file was locked, the link repair component 130 can recalculate the address of any relative links in the file. Relative links are links that specify an address in a manner that is relative to the position of the file containing the links, for example, the address can be specified as the address of the file plus an offset. Alternatively, instead of modifying the links, the link repair component 130 can move the file to its former location.

Figure 3:
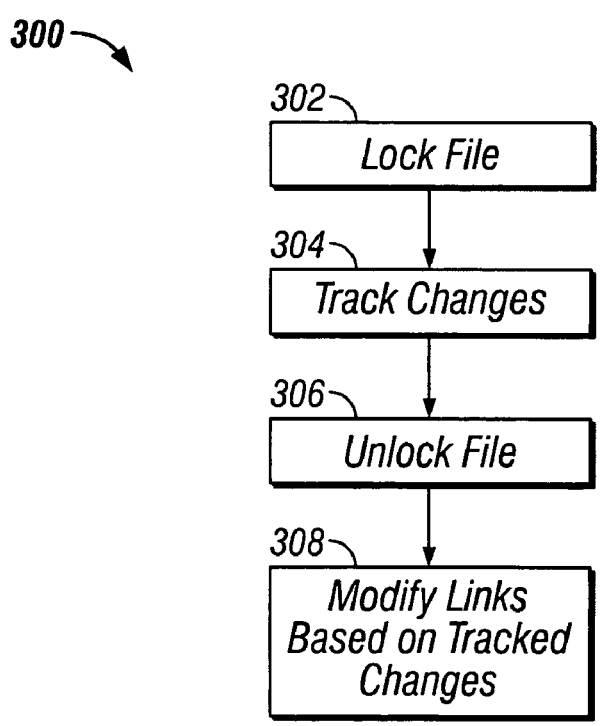
FIG. 3 is a flow diagram illustrating another method for repairing links in a locked file.

FIG. 3 shows another method 300 for repairing links in a file. Like method 200, method 300 begins when a file is locked (302).

While the file is locked, the link repair component 130 identifies changes to one or more of the links in the locked file (304). The changes can include structural changes such as changes in the location or identity of a target file. The changes can be detected using conventional techniques, for example, by monitoring file move operations executed by the file system.

The link repair component 130 stores the identified changes in a data structure separate from the locked file, for example, in a change log. For each changed link, the log can record the original target address and the new target address, as shown in FIG. 4. Alternatively, the log can record the original target file ID and the new target file ID, as shown in FIG. 5. In yet another implementation, instead of storing target information for the links, the link repair component 130 can store the file operations that caused the links to change (e.g., the move commands), as shown in FIG. 6.

When the locked file is later unlocked, (306) the link repair component 130 repairs the changed links in the unlocked file based on the stored information (308). The link repair component 130 modifies each changed link to refer to the new target instead of the old target. Alternatively, where file operations are stored instead of targets, the link repair component 130 determines the new target of the changed links by applying the stored file operations to the original target.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments and scenarios. Other embodiments and scenarios are within the scope of the following claims. For example, steps of the invention can be performed in a different order and still achieve desirable results. The invention can be used in electronic publishing systems, web publishing systems, or any other system that manages compound documents (documents containing references to others documents).

What is claimed is:

1. A computer-implemented method for repairing links in a file, the method comprising:
    locking a first file, the first file containing one or more links, each link specifying an address of a target file; and
    while the first file is locked, storing information in a data structure separate from the first file, the stored information identifying changes to one or more links in the first file, the stored information identifying an old target file and a new target file for each changed link;
    unlocking the first file; and
    after unlocking the first file, repairing the changed links in the first file based on the stored information.

2. The method of claim 1, wherein the old target file and the new target file are identified by specifying the address of each target file.

3. The method of claim 1, wherein the old target file and the new target file are identified by specifying a file identifier for each target file, the file identifier being independent of the address of the target file.

4. The method of claim 1, wherein repairing the changed links in the first file includes modifying each changed link to reflect the new target file.

5. A computer program product, tangibly stored on a computer-readable medium, for repairing links in a first file, each link specifying an address of a target file, the product comprising instructions operable to cause a programmable processor to:
    for one or more of the links in the first file, in response to the first file being locked, store a file identifier that identifies the target file of each link, the file identifier being independent of the address of the target file; and
    after the first file is unlocked at a later time, repair one or more of the links based on the stored file identifiers.

6. The computer program product of claim 5, further comprising instructions operable to cause the programmable processor to execute the repair step in response to the first file being unlocked.

7. A computer program product, tangibly stored on a computer-readable medium, for repairing links in a first file, each link specifying an address of a target file, the product comprising instructions operable to cause a programmable processor to:
    while the first file is locked, store information in a data structure separate from the first file, the stored information identifying changes to one or more links in the first file, the stored information identifying an old target file and a new target file for each changed link.

8. The computer program product of claim 7, further comprising instructions operable to cause the programmable processor to repair one or more of the links based on the stored information.

9. A computer-implemented method comprising:
    examining a first file to determine whether the first file is locked, the first file containing one or more links, each link specifying an address of a respective target file;
    if the first file is not locked, then modifying one or more links in the first file if either the first file was moved or one or more links in the first file are broken or ambiguous; and
    if the first file is locked, then while the first file is locked, storing information in a data structure separate from the first file, the stored information identifying changes to one or more links in the first file, the stored information identifying an old target file and a new target file for the each changed link.

10. The computer-implemented method of claim 9, where the modification comprises:
    if the first file was moved, then recalculating one or more links in the first file; and
    if one or more links in the first file are either broken or ambiguous, then repairing each broken or ambiguous link.

* * * * *